US012741750B1

(12) United States Patent
Richardson et al.

(10) Patent No.: US 12,741,750 B1

(45) Date of Patent: Sep. 22, 2026

(54) SHAFT ASSEMBLY FOR AN AIRCRAFT ENGINE

(71) Applicant: Pratt & Whitney Canada Corp., Longueuil (CA)

(72) Inventors: Tyler Richardson, Toronto (CA); Nathan Tomes, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/231,310

(22) Filed: Jun. 6, 2025

(51) Int. Cl.
*B64D 35/00* (2006.01)
*F02C 7/36* (2006.01)

(52) U.S. Cl.
CPC ................ *B64D 35/00* (2013.01); *F02C 7/36* (2013.01); *F05D 2240/60* (2013.01)

(58) Field of Classification Search
CPC .... F16D 2001/103; F16D 1/101; F16D 1/116; F16D 3/06; F16D 3/68; F16D 1/06; F16D 1/10; F16D 3/00; F16D 3/387; F16D 1/0882; F16D 2300/22; F16D 2300/12; F16C 3/02; F16C 1/02; F16C 1/08; F16C 2326/06; F16C 2202/02; Y10T 403/7026; F01D 5/027; F01D 25/168; F01D 5/026; F01D 5/26; B64C 13/28; B64D 35/00; B64D 41/007; F02C 3/107; F02C 7/36; F04D 29/662; F05D 2240/60; F05D 2260/4031; F05D 2220/34; F05D 2220/74; F05D 2220/40; F16F 15/10; F16F 2236/08
See application file for complete search history.

(56) References Cited

U.S. PATENT DOCUMENTS

| | | | | |
|---|---|---|---|---|
| 1,780,727 A * | 11/1930 | Tenney | F16D 3/68 416/134 R |
| 3,869,877 A * | 3/1975 | Brahler | F16C 1/02 464/97 |
| 4,115,022 A * | 9/1978 | Orain | F16D 3/06 192/108 |
| 4,707,945 A * | 11/1987 | Arai | B24B 37/08 451/288 |
| 5,354,237 A * | 10/1994 | Amborn | F16F 15/10 464/180 |
| 6,733,039 B2 * | 5/2004 | Honda | B62D 1/16 280/780 |

(Continued)

FOREIGN PATENT DOCUMENTS

FR 3018850 B1 6/2018

*Primary Examiner* — Eric J Zamora Alvarez
(74) *Attorney, Agent, or Firm* — Getz Balich LLC

(57) ABSTRACT

An assembly for an aircraft powerplant includes a rotational load and a shaft. The shaft is coupled to the rotational load. The shaft extends along an axis between and to a first axial shaft end and a second axial shaft end. The shaft includes a slotted axial segment extending circumferentially about the axis. The slotted axial segment extends axially between and to a first segment end and a second segment end. The slotted axial segment has an outer diameter surface. The slotted axial segment forms a plurality of slots extending lengthwise through the slotted axial segment in an axial direction relative to the axis. The plurality of slots extend radially through the outer diameter surface. The plurality of slots are arranged as a circumferential array about the slotted axial segment.

10 Claims, 6 Drawing Sheets

(56) References Cited

U.S. PATENT DOCUMENTS

| | | | | |
|---|---|---|---|---|
| 7,946,924 | B2 * | 5/2011 | Neugebauer .............. | F16C 3/03 403/359.6 |
| 8,013,481 | B2 | 9/2011 | Sommerlatte | |
| 8,051,710 | B2 | 11/2011 | Van Dam | |
| 8,664,792 | B2 | 3/2014 | Rebsdorf | |
| 9,188,105 | B2 | 11/2015 | Bortoli | |
| 10,295,042 | B2 * | 5/2019 | Russ .................... | B64D 41/007 |
| 11,566,657 | B2 | 1/2023 | Kiełbowicz | |
| 11,953,072 | B2 | 4/2024 | Wolf | |
| 2002/0020243 | A1 * | 2/2002 | Ziegert ................... | F16F 15/12 409/141 |
| 2023/0421005 | A1 | 12/2023 | Okano | |

* cited by examiner 64
92
134
88
70
132
130
134
90

SHAFT ASSEMBLY FOR AN AIRCRAFT ENGINE

TECHNICAL FIELD

This disclosure relates generally to engines for aircraft and, more particularly, to shaft assemblies for aircraft powerplants.

BACKGROUND OF THE ART

Aircraft powerplants typically include one or more shafts configured to drive rotation of one or more mechanical loads such as a propulsor, an electrical generator rotor, a compressor rotor, or the like. Various shaft configurations are known. While these known shaft configurations may be suitable for their intended purposes, there is always room in the art for improvement.

SUMMARY

According to an aspect of the present disclosure, an assembly for an aircraft powerplant includes a rotational load and a shaft. The shaft is coupled to the rotational load. The shaft extends along an axis between and to a first axial shaft end and a second axial shaft end. The shaft includes a slotted axial segment extending circumferentially about the axis. The slotted axial segment extends axially between and to a first segment end and a second segment end. The slotted axial segment has an outer diameter surface. The slotted axial segment forms a plurality of slots extending lengthwise through the slotted axial segment in an axial direction relative to the axis. The plurality of slots extend radially through the outer diameter surface. The plurality of slots are arranged as a circumferential array about the slotted axial segment.

In any of the aspects or embodiments described above and herein, the slotted axial segment may include a circumferentially-continuous body portion, and the circumferentially-continuous body portion may form the first segment end and a first axial end of each of the plurality of slots.

In any of the aspects or embodiments described above and herein, the shaft may include a second axial segment axially adjacent the slotted axial segment, the slotted axial segment may have a first diameter, the second axial segment may have a second diameter, and the first diameter may be greater than the second diameter.

In any of the aspects or embodiments described above and herein, the slotted axial segment may extend radially between and to the outer diameter surface and an inner diameter surface, and each of the plurality of slots may extend radially through the slotted axial segment from the outer diameter surface to the inner diameter surface.

In any of the aspects or embodiments described above and herein, a diameter of the slotted axial segment may vary along an axial span of the slotted axial segment between the first segment end and the second segment end.

In any of the aspects or embodiments described above and herein, the slotted axial segment may have a convex profile facing radially outward from the shaft, and the convex profile may extend between the first segment end and the second segment end.

In any of the aspects or embodiments described above and herein, the diameter may have a maximum at the first segment end and the second segment end and a minimum at an axially-intermediate position between the first segment end and the second segment end.

In any of the aspects or embodiments described above and herein, the shaft may include a plurality of slotted axial segments including the slotted axial segment and a second slotted axial segment.

In any of the aspects or embodiments described above and herein, the second slotted axial segment may be connected to the slotted axial segment.

In any of the aspects or embodiments described above and herein, the slotted axial segment may include an inner body member, the inner body member may be circumferentially continuous, and the slots may extend radially from the outer diameter surface to the inner body member.

In any of the aspects or embodiments described above and herein, the slotted axial segment may extend radially between and to the outer diameter surface and an inner diameter surface, the inner body member may be a ring extending circumferentially about the axis, and the ring may form the inner diameter surface.

In any of the aspects or embodiments described above and herein, the slotted axial segment may include a plurality of ribs extending axially between the first segment end and the second segment end, and each of the plurality of ribs may extend radially from the inner body member to the outer diameter surface.

In any of the aspects or embodiments described above and herein, the slotted axial segment may include a first circumferentially-continuous body portion forming the first segment end and a second circumferentially-continuous body portion forming the second segment end, and each of the plurality of ribs may extend between and to the first circumferentially-continuous body portion and the second circumferentially-continuous body portion.

In any of the aspects or embodiments described above and herein, each of the plurality of ribs may have an undercut profile.

In any of the aspects or embodiments described above and herein, the assembly may further include a propulsion system including the rotational load and an engine, the rotational load may be a propulsor of the propulsion system, and the engine may include the shaft.

In any of the aspects or embodiments described above and herein, the assembly may further include a propulsion system including a propulsor, an engine, and a turbocompressor, the engine may include an engine shaft, the engine shaft may be coupled with the propulsor, the turbocompressor may include a compressor section, a turbine section, and a rotational assembly, the compressor section and the turbine section may be connected in fluid communication with the engine, the rotational assembly may include a bladed compressor rotor of the compressor section, a bladed turbine rotor of the turbine section, and the shaft connecting the bladed compressor rotor an the bladed turbine rotor, the shaft may be coupled with the engine shaft, and the rotational load may be the bladed compressor rotor.

According to another aspect of the present disclosure, an assembly for an aircraft powerplant includes a rotational load and a shaft. The shaft is coupled to the rotational load. The shaft extends along an axis between and to a first axial shaft end and a second axial shaft end. The shaft includes a slotted axial segment extending circumferentially about the axis. The slotted axial segment extends axially between and to a first segment end and a second segment end. The slotted axial segment forms an axial portion of the shaft. The slotted axial segment has an outer diameter surface. The slotted axial segment includes a first circumferentially-continuous body portion and a second circumferentially-continuous body portion. The first circumferentially-continuous body portion forms the first segment end. The second circumferentially-continuous body portion forms the second segment end. The slotted axial segment forms a plurality of slots extending lengthwise between and to the first circumferentially-continuous body portion and the second circumferentially-continuous body portion. The plurality of slots extend radially through the outer diameter surface. The plurality of slots are arranged as a circumferential array about the slotted axial segment.

In any of the aspects or embodiments described above and herein, the slotted axial segment may have a convex profile facing radially outward from the shaft, and the convex profile may extend between the first segment end and the second segment end.

In any of the aspects or embodiments described above and herein, the diameter may have a maximum at the first segment end and the second segment end and a minimum at an axially-intermediate position between the first segment end and the second segment end.

According to another aspect of the present disclosure, an engine for an aircraft propulsion system includes a propulsor and a shaft. The shaft is coupled with the propulsor. The shaft is rotatable about an axis. The shaft extends along the axis between and to a first axial shaft end and a second axial shaft end. The shaft includes a slotted axial segment and a second axial segment extending circumferentially about the axis. The slotted axial segment extends axially between and to a first segment end and a second segment end. The slotted axial segment has an outer diameter surface and a first diameter. The slotted axial segment forms a plurality of slots extending lengthwise through the slotted axial segment in an axial direction relative to the axis. The plurality of slots extend radially through the outer diameter surface. The plurality of slots are arranged as a circumferential array about the slotted axial segment. The second axial segment is connected to the slotted axial segment at the second segment end. The second axial segment has a second diameter. The first diameter is greater than the second diameter.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
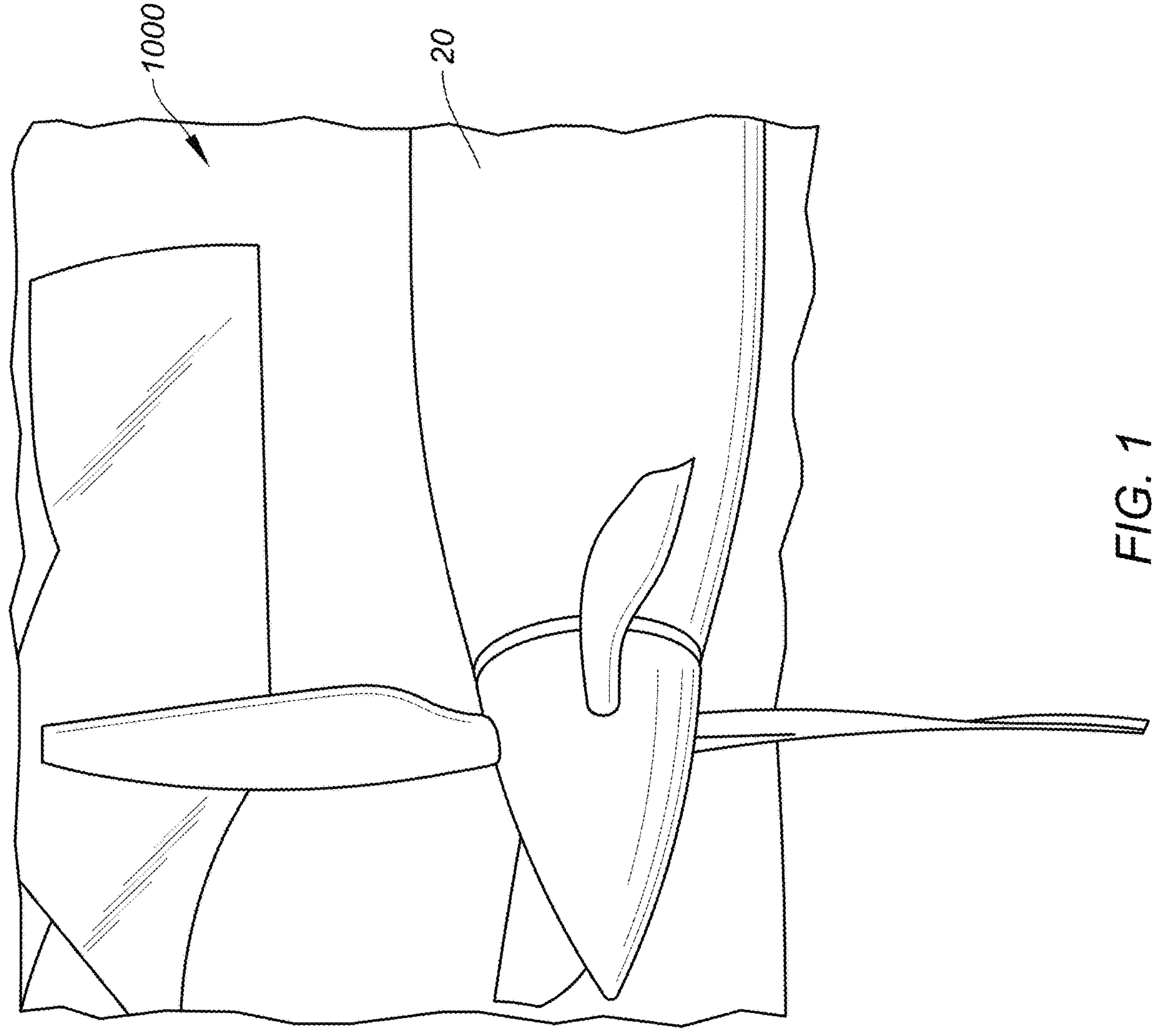
FIG. 1 illustrates an aircraft including a propulsion system, in accordance with one or more embodiments of the present disclosure.

FIG. 1 illustrates an aircraft 20 including at least one propulsion system 22. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
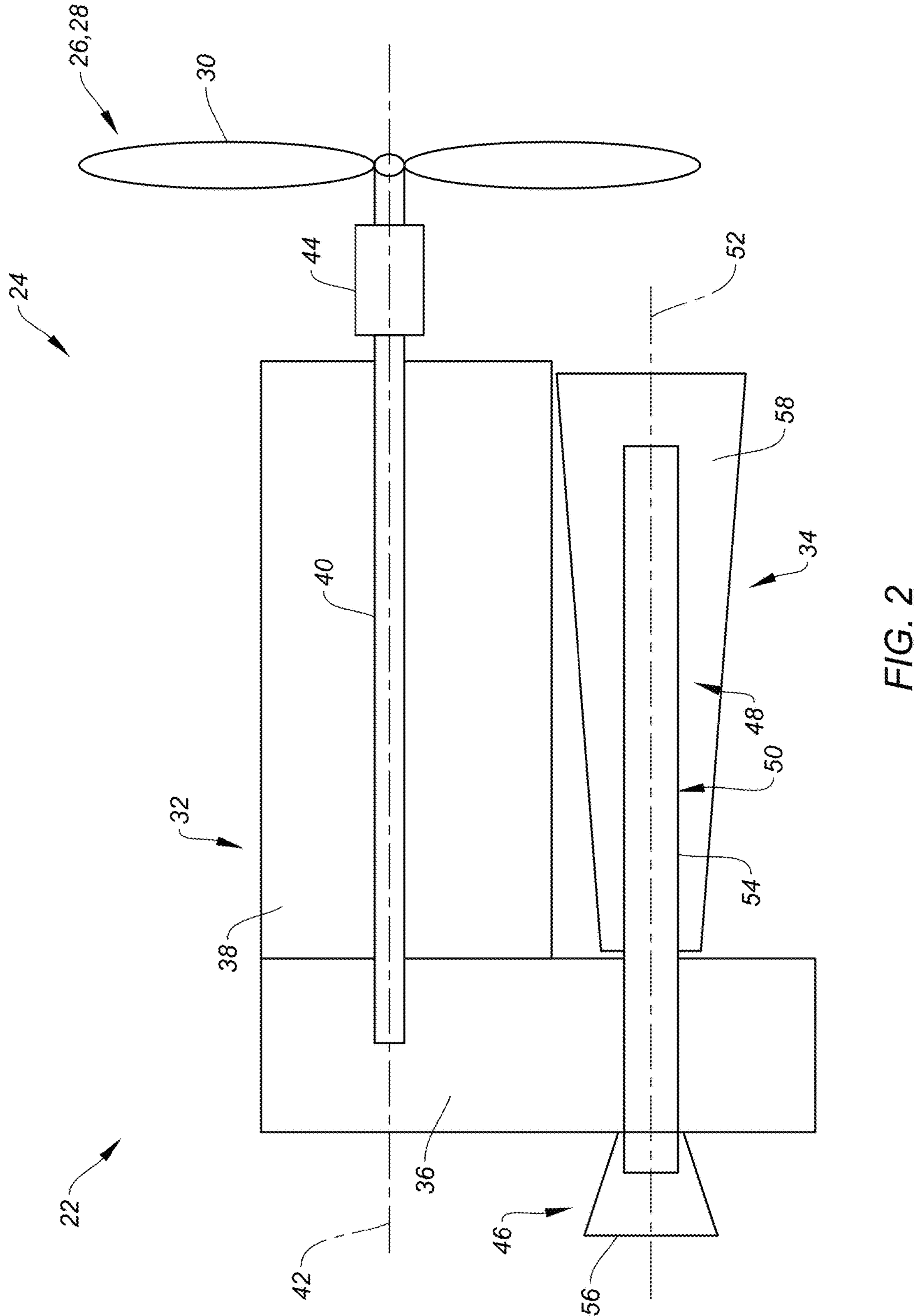
FIG. 2 schematically illustrates a cutaway, side view of a powerplant assembly for an aircraft, in accordance with one or more embodiments of the present disclosure.

FIG. 2 schematically illustrates a powerplant assembly 24. As shown in FIG. 2, the powerplant assembly 24 may form a portion of the propulsion system 22. Alternatively, the powerplant assembly 24 may form a portion of an electric power system (or more generally an electric machine) such as, but not limited to, an auxiliary power unit (APU) for the aircraft 20 (see FIG. 1). While the powerplant assembly 24 is described herein with respect to aircraft applications, aspects of the present disclosure powerplant assembly 24 may also be equally applicable to ground-based powerplant applications (e.g., ground-based power generation, ground-based vehicles, etc.). The propulsion system 22 of FIG. 2 includes the powerplant assembly 24 and a mechanical load 26. The mechanical load 26 may be configured as or otherwise include a rotor 28 mechanically driven by the powerplant assembly 24. This driven rotor 28 may be a bladed propulsor rotor 30 (e.g., an air mover or "propulsor") where the powerplant assembly 24 is (or is part of) the propulsion system 22, as shown in FIG. 2. The propulsor rotor 30 (e.g., a propeller, a rotorcraft rotor, etc.) includes a plurality of rotor blades arranged circumferentially around and connected to at least (or only) one rotor disk or hub. Alternatively, the driven rotor 28 may be a generator rotor in an electric power generator (or more generally an electric machine).

The powerplant assembly 24 includes an engine 32, a turbocompressor 34, and a geartrain 36. The engine 32 of FIG. 2 is configured as an intermittent combustion engine. In particular, the engine 32 of FIG. 2 is configured as a rotary engine (e.g., a Wankel engine). However, the engine 32 may alternatively be configured as a gas turbine engine, a reciprocating engine (e.g., a piston engine), or another suitable thermal engine type. The engine 32 includes a rotor assembly 38 and an engine shaft 40 (e.g., a crankshaft). The rotor assembly 38 is coupled with the engine shaft 40 and configured to drive rotation of the engine shaft 40 about a rotational axis 42. The engine shaft 40 is coupled with the driven rotor 28 such that rotation of the engine shaft 40 by the rotor assembly 38 drives rotation of the driven rotor 28. For example, the engine shaft 40 may be coupled with the driven rotor 28 by a geartrain 44 (e.g., a transmission, a speed change device, an epicyclic geartrain, etc.).

The turbocompressor 34 includes a compressor section 46, a turbine section 48, and a rotational assembly 50 (e.g., a spool). The rotational assembly 50 is rotatable about a rotational axis 52. The rotational assembly 50 includes a shaft 54, a bladed compressor rotor 56 of the compressor section 46, and a bladed turbine rotor 58 of the turbine section 48. The shaft 54 interconnects the bladed compressor rotor 56 and the bladed turbine rotor 58. The geartrain 36 (e.g., a transmission, a speed change device, an epicyclic geartrain, etc.) couples the rotational assembly 50 (e.g., the shaft 54) with the engine shaft 40.

In operation, ambient air is received by the compressor section 46 and compressed by rotation of the bladed compressor rotor 56. This compressed air is directed to an air intake of the engine 32 along a gas flow path to facilitate an internal combustion process of the engine 32. This internal combustion process drives rotation of the engine shaft 40, as well as the bladed propulsor rotor 30 (e.g., through the geartrain 44). Combustion exhaust gas from the engine 32 is directed along the gas flow path to the turbine section 48 and across the bladed turbine rotor 58, thereby causing the bladed turbine rotor 58 to rotate and rotationally drive the rotational assembly 50. The rotation of the rotational assembly 50 additionally applies power to the engine shaft 40 through the geartrain 36, allowing the rotational assembly 50 assist the engine 32 in rotationally driving the bladed propulsor rotor 30.

Torque is transmitted between rotational components of an aircraft powerplant assembly similar to that discussed above with respect to the engine shaft 40 and the turbocompressor shaft 54. To reduce transmissibility of torsional vibration throughout an engine and to a shaft-driven load, long slender torque shafts may conventionally be used such that a torsional mode of the shaft is well below its excitation frequency. In other words, the shaft may be operated such that its torsional excitation frequency is greater than the shaft's torsional resonance frequency (e.g., the shaft may be operated supercritically). However, in at least some conventional engines, these torque shafts may exhibit low bending stiffness and may, therefore, experience rotordynamic issues in their lateral direction leading, for example, to increased shaft stress and/or contact with concentric shafts or static structures.

Figures 3, 4:
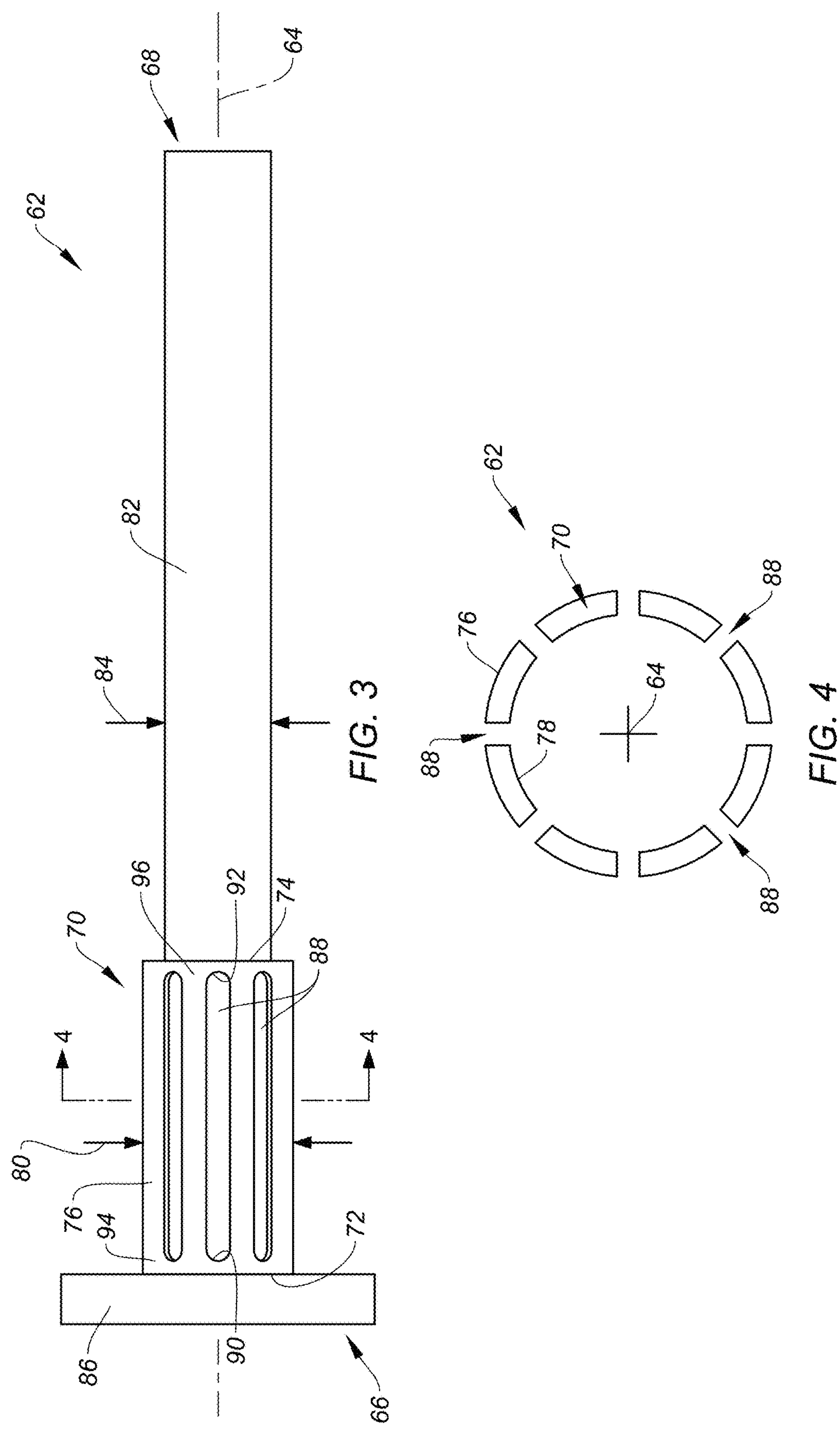
FIG. 3 illustrates a side view of a shaft for the engine, in accordance with one or more embodiments of the present disclosure.
FIG. 4 illustrates a cross-sectional view of the shaft of FIG. 3 taken along Line 4-4 of FIG. 3, in accordance with one or more embodiments of the present disclosure.

FIG. 3 illustrates a side view of a shaft 62. FIG. 4 illustrates a cross-sectional view of the shaft 62 taken along Line 4-4 of FIG. 3. The shaft 62 may be used to interconnect two or more rotational components such as, but not limited to, a crankshaft, a turbine rotor, a compressor rotor, a gearbox, or another rotational load. For example, the engine 32 may include the shaft 62 as the turbocompressor shaft 54 interconnecting the bladed compressor rotor 56 and the bladed first turbine rotor 58. Similarly, for example, the engine 32 may include the shaft 62 as the engine shaft 40 directly or indirectly coupling the rotor assembly 38 and the propulsor 24.

The shaft 62 extends along an axis 64 (e.g., an axial centerline) between and to a first axial end 66 of the shaft 62 and a second axial end 68 of the shaft 62. At least an axial portion of the shaft 62 of FIGS. 3 and 4 is hollow (e.g., tubular) such that the shaft 62 extends circumferentially about (e.g., completely around) and is radially spaced from the axis 64.

The shaft 62 includes at least one slotted axial segment 70. The slotted axial segment 70 is a hollow (e.g., tubular) segment of the shaft 62 extending along the axis 64 between and to a first segment end 72 of the slotted axial segment 70 and a second segment end 74 of the slotted axial segment 70. The slotted axial segment 70 extends radially between and to an outer diameter surface 76 of the slotted axial segment 70 and an inner diameter surface 78 of the slotted axial segment 70. The slotted axial segment 70 is a radially enlarged segment of the shaft 62. The slotted axial segment 70 has a diameter 80. The diameter 80 may be substantially constant along the axial span of the slotted axial segment 70 from the first segment end 72 to the second segment end 74. However, as will be discussed in further detail, the slotted axial segment 70 is not limited to having a substantially constant diameter 80. The diameter 80 may be greater than that of other axial segments of the shaft 62. For example, the shaft 62 of FIG. 3 includes at least one second axial segment 82 having a diameter 84 which is less than the diameter 80 of the slotted axial segment 70. The slotted axial segment 70 may be disposed at (e.g., on, adjacent, or proximate) the second axial segment 82. The slotted axial segment 70 of FIG. 3 is disposed axially between the second axial segment 82 and an attachment flange 86 of the shaft 62. In particular, the first segment end 72 is disposed at (e.g., on, adjacent, or proximate) the attachment flange 86 and the second segment end 74 is disposed at (e.g., on, adjacent, or proximate) the second axial segment 82. The present disclosure, however, is not limited to the foregoing exemplary arrangement of the shaft 62 and its slotted axial segment 70.

The slotted axial segment 70 forms a plurality of slots 88 through the shaft 62. Each of the slots 88 extends radially through the shaft 62 within the slotted axial segment 70. Each of the slots 88 extends between and to the outer diameter surface 76 and the inner diameter surface 78. The slots 88 each extend lengthwise in the axial direction between and to a first axial end 90 of the respective slot 88 and a second axial end 92 of the respective slot 88. The slots 88 may extend along all or a substantial portion of the axial span of the slotted axial segment 70 between the first segment end 72 and the second segment end 74. For example, the first axial end 90 may be disposed at (e.g., on, adjacent, or proximate) the first segment end 72 and the second axial end 92 may be disposed at (e.g., on, adjacent, or proximate) the second segment end 74. The slotted axial segment 70 of FIG. 3 includes a first circumferentially-continuous body portion 94 and a second circumferentially-continuous body portion 96. The circumferentially-continuous body portions 94, 96 may extend between and to the outer diameter surface 76 and the inner diameter surface 78. The first circumferentially-continuous body portion 94 forms the first segment end 72 and the first axial end 90 of each of the slots 88. The second circumferentially-continuous body portion 96 forms the second segment end 74 and the second axial end 92 of each of the slots 88. The slots 88 are arranged about the slotted axial segment 70 and the axis 64 as a circumferential array. For example, the slots 88 may be circumferentially equispaced about the slotted axial segment 70 and the axis 64.

The present disclosure shaft 62 and its slotted axial segment(s) 70 facilitate increased bending stiffness of the shaft 62 and reduced torsional stiffness of the shaft 62 compared to the conventional torque shaft configurations discussed above. The increased bending stiffness of the shaft 62 may increase the bending mode of the shaft 62 above the operating range of the shaft 62 for the engine 32, thereby reducing lateral displacement of the shaft 62. The reduced torsional stiffness of the shaft 62 facilitates reductions in torsional vibration transmitted through the shaft 62.

Figure 5:
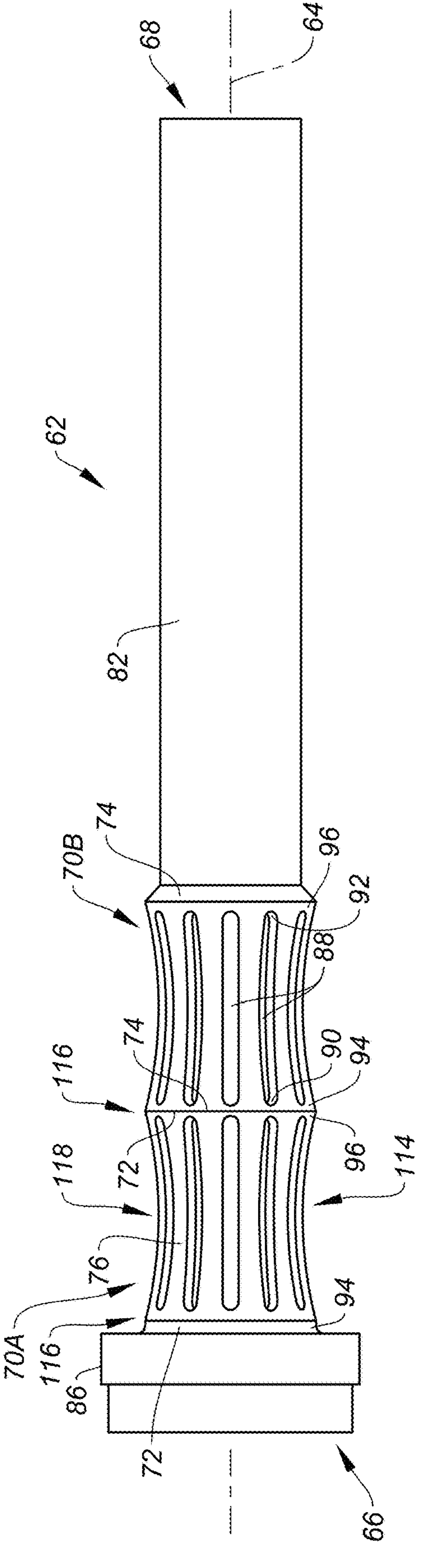
FIG. 5 illustrates a side view of a yet another shaft for the engine, in accordance with one or more embodiments of the present disclosure.

Referring to FIG. 5, in some embodiments, the diameter 80 (see FIG. 3) of the slotted axial segment 70 may vary along its axial span. The slotted axial segment 70 of FIG. 5 has a convex profile 114 extending between the first segment end 72 and the second segment end 74. The convex profile 114 is characterized by a convex curvature of the slotted axial segment 70 (e.g., the outer diameter surface 76) facing radially outward from the shaft 62. The diameter 80 may have a maximum 116 at the first segment end 72 and/or the second segment end 74. The diameter 80 may have a minimum at an axially intermediate portion of the slotted axial segment 70, for example, at (e.g., on, adjacent, or proximate) an axial center of the slotted axial segment 70. The maximum 116 of the diameter 80 may be greater than the diameter 84 of the second axial segment(s) 82. The minimum 118 of the diameter 80 may also be greater than the diameter 84 of the second axial segment(s) 82.

Still referring to FIG. 5, in some embodiments, the shaft 62 may include more than one slotted axial segment 70. For example, the shaft 62 of FIG. 5 includes a first slotted axial segment 70A and a second slotted axial segment 70B. The second slotted axial segment 70B of FIG. 5 is disposed axially adjacent the first slotted axial segment 70A. For example, the second slotted axial segment 70B may be disposed axially coincident with the first slotted axial segment 70A such that the first segment end 72 of the second slotted axial segment 70B is disposed at (e.g., on, adjacent, or proximate) the second segment end 74 of the first slotted axial segment 70A. The second axial segment 82 of FIG. 5 is disposed at (e.g., on, adjacent, or proximate) the second slotted axial segment 70B (e.g., the second segment end 74). In some alternative embodiments, however, the second axial segment(s) 82 may be disposed axially between the slotted axial segments 70 (e.g., the first slotted axial segment 70A and the second slotted axial segment 70B), axially coincident more than one of the slotted axial segments 70 (e.g., the first slotted axial segment 70A and the second slotted axial segment 70B), etc. In some embodiments, all or a substantial portion of shaft 62 may be formed by a plurality of slotted axial segments 70 arranged together between the first axial end 66 and the second axial end 68.

Figure 6:
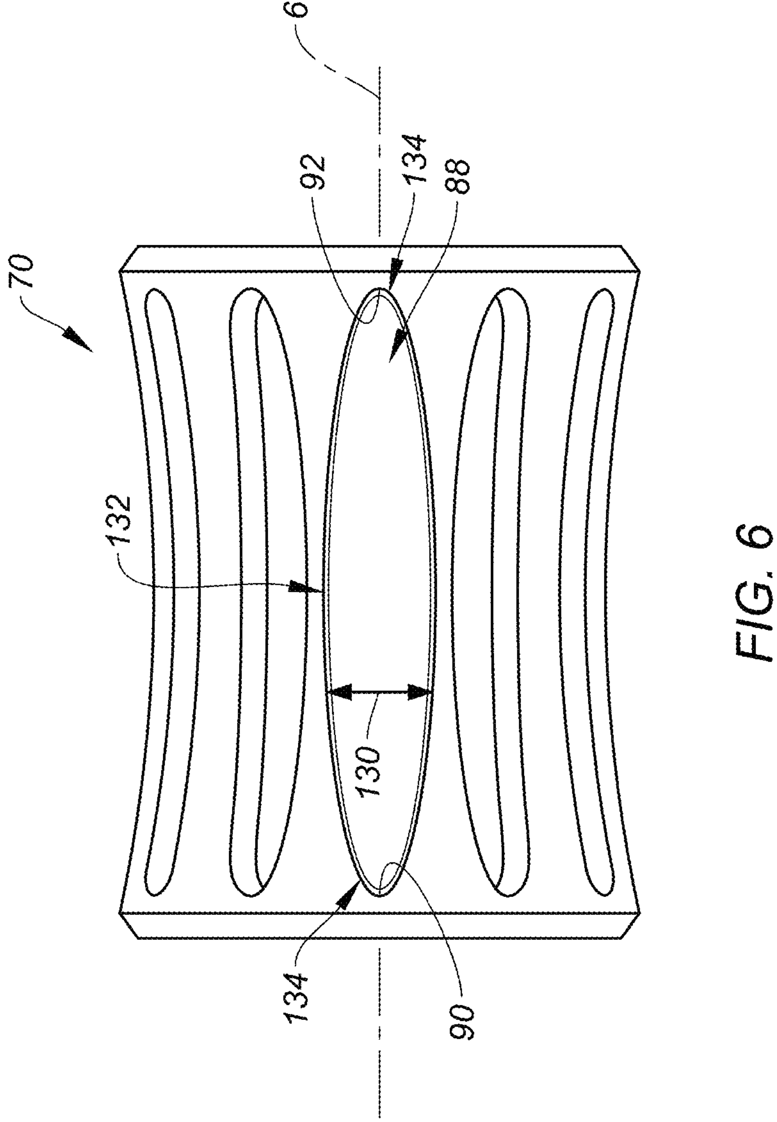
FIG. 6 illustrates a side view of a yet another shaft for the engine, in accordance with one or more embodiments of the present disclosure.

Referring to FIG. 6, in some embodiments, each of the slots 88 may have a circumferential width 130 which may vary along its axial span between the first axial end 90 and the second axial end 92. For example, each of the slots 88 may have an oval-shaped profile wherein the circumferential width 130 is larger at an axially intermediate portion of the respective slot 88 than at the first axial end 90 and the second axial end 92. In other words, the circumferential width 130 may have a maximum 132 at the axially intermediate portion of the respective slot 88 and a minimum 134 at the first axial end 90 and/or the second axial end 92. The maximum 132 may be disposed axially at the maximum 116 (see FIG. 5). Correspondingly, the slotted axial segment 70 may have a circumferential thickness between each circumferentially-adjacent pair of the slots 88 which is smaller at the axially intermediate portion of the respective slots 88 than at the first axial end 90 and the second axial end 92.

Figures 7, 8, 9:
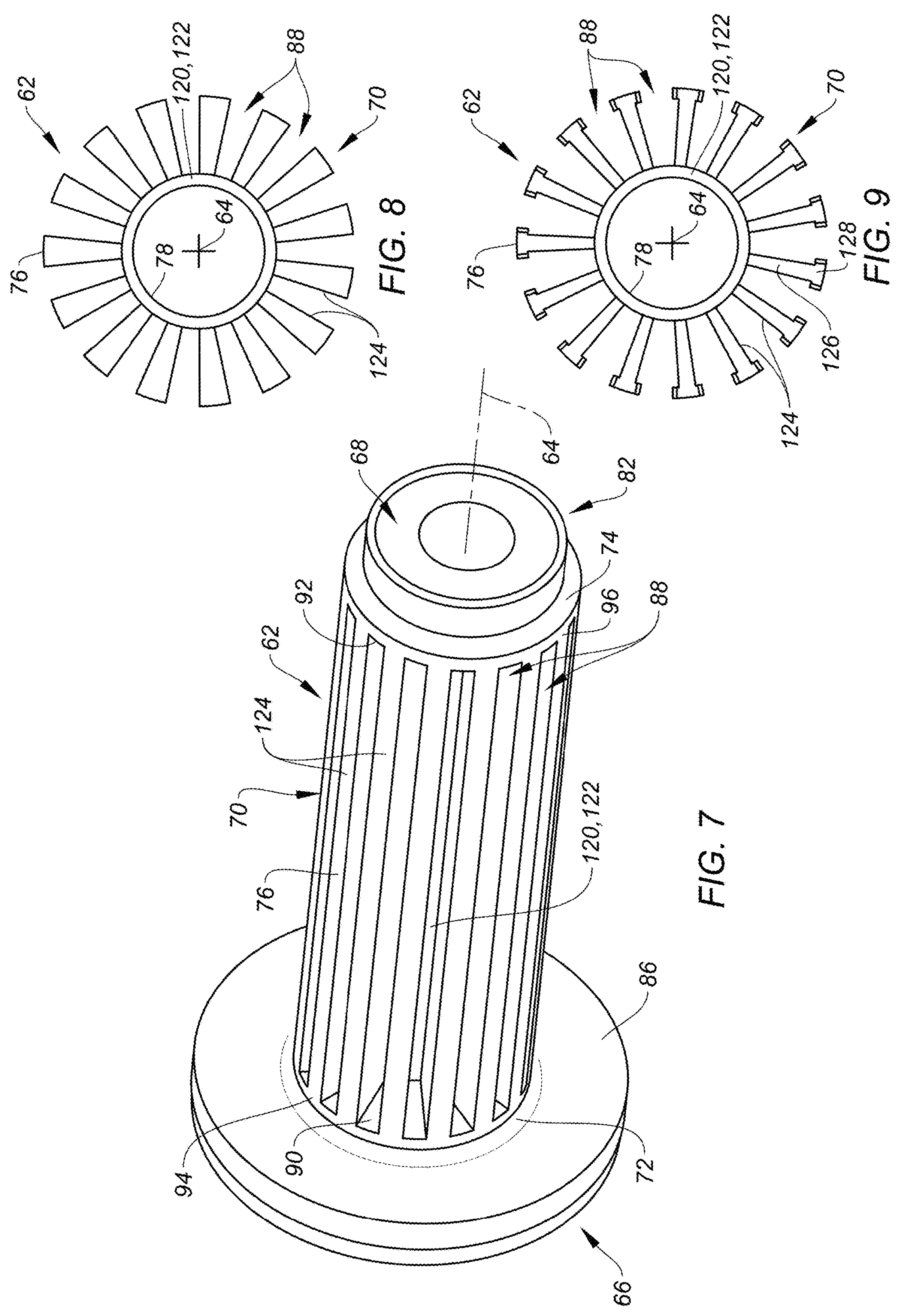
FIG. 7 illustrates a perspective view of a yet another shaft for the engine, in accordance with one or more embodiments of the present disclosure.
FIG. 8 illustrates a cross-sectional view of the shaft of FIG. 7, in accordance with one or more embodiments of the present disclosure.
FIG. 9 illustrates a cross-sectional view of yet another shaft, in accordance with one or more embodiments of the present disclosure.

FIGS. 7 and 8 illustrate another embodiment of the shaft 62. FIG. 7 illustrates a perspective view of the shaft 62. FIG. 8 illustrates a cross-sectional view of the shaft 62 of FIG. 8 taken along a plane orthogonal to the axis 64. The shaft 62 of FIGS. 7 and 8 further includes an inner body member 120 forming the inner diameter surface 78. The inner body member 120 is a circumferentially-continuous body of the shaft 62. The inner body member 120 of FIGS. 7 and 8 is configured as a ring 122 (e.g., a tubular body) extending circumferentially about (e.g., completely around) the axis 64. Alternatively, the inner body member 120 may be a solid body extending on and along the axis 64. As shown in FIG. 8, the inner body member 120 encloses the inner radial ends of the slots 88. The shaft 62 of FIGS. 7 and 8 may be understood as including a plurality of axially-extending ribs 124 connected to and projecting radially outward from the inner body member 120 to the outer diameter surface 76. The inner body member 120 supports the ribs 124 reducing centrifugal stress on the ribs 124. The ribs 124 are arranged about the slotted axial segment 70 and the axis 64 as a circumferential array. For example, the ribs 124 may be circumferentially equispaced about the slotted axial segment 70 and the axis 64. Each of the slots 88 is formed by and between each circumferentially adjacent pair of the ribs 124. Each of the ribs 124 extends lengthwise in the axial direction along all or a substantial portion of the axial span of the slotted axial segment 70 between the first segment end 72 and the second segment end 74. Each of the ribs 124 may extend between and to the first circumferentially-continuous body portion 94 and the second circumferentially-continuous body portion 96. The shaft 62 of FIGS. 7 and 8 and its slotted axial segment(s) 70 facilitate increased bending stiffness of the shaft 62 and reduced torsional stiffness of the shaft 62 compared to the conventional torque shaft configurations discussed above.

FIG. 9 illustrates a cross-sectional view of the shaft 62 for an alternative embodiment of the ribs 124 in comparison, for example, to the ribs 124 of FIG. 8. The ribs 124 of FIG. 9 include an undercut profile. In particular, each of the ribs 124 includes a radial segment 126 and a circumferential segment 128. The radial segment 126 extends radially between and to the inner body member 120 (e.g., the ring 122) and the circumferential segment 128. The radial segment 126 may have a substantially constant circumferential width between the inner body member 120 and the circumferential segment 128. The circumferential segment 128 has an enlarged circumferential width relative to the radial segment 126 such that the circumferential segment 128 forms a T-shaped profile with the radial segment 126. The circumferential segment 128 forms the outer diameter surface 76.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms “substantially,” “about,” “approximately,” and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft powerplant, the assembly comprising:

a rotational load; and a shaft coupled to the rotational load, the shaft extending along an axis between and to a first axial shaft end and a second axial shaft end, the shaft including a slotted axial segment extending circumferentially about the axis, the slotted axial segment extending axially between and to a first segment end and a second segment end, the slotted axial segment having an outer diameter surface, the slotted axial segment forming a plurality of slots extending lengthwise through the slotted axial segment in an axial direction relative to the axis, the plurality of slots extending radially through the outer diameter surface, the plurality of slots being arranged as a circumferential array about the slotted axial segment, a diameter of the slotted axial segment varying along an axial span of the slotted axial segment between the first segment end and the second segment end, the diameter having a maximum at the first segment end and the second segment end and a minimum at an axially-intermediate position between the first segment end and the second segment end, the slotted axial segment having a convex profile facing radially outward from the shaft, the convex profile extending between the first segment end and the second segment end.

2. The assembly of claim 1, wherein the slotted axial segment includes a circumferentially-continuous body portion, and the circumferentially-continuous body portion forms the first segment end and a first axial end of each of the plurality of slots.

3. The assembly of claim 1, wherein the shaft includes a second axial segment axially adjacent the slotted axial segment, the slotted axial segment has a first diameter, the second axial segment has a second diameter, and the first diameter is greater than the second diameter.

4. The assembly of claim 1, wherein the slotted axial segment extends radially between and to the outer diameter surface and an inner diameter surface, and each of the plurality of slots extends radially through the slotted axial segment from the outer diameter surface to the inner diameter surface.

5. The assembly of claim 1, wherein the shaft includes a plurality of slotted axial segments including the slotted axial segment and a second slotted axial segment.

6. The assembly of claim 5, wherein the second slotted axial segment is connected to the slotted axial segment.

7. The assembly of claim 1, further comprising a propulsion system including the rotational load and an engine, the rotational load being a propulsor of the propulsion system, the engine including the shaft.

8. The assembly of claim 1, further comprising a propulsion system including a propulsor, an engine, and a turbocompressor, the engine including an engine shaft, the engine shaft coupled with the propulsor, the turbocompressor including a compressor section, a turbine section, and a rotational assembly, the compressor section and the turbine section connected in fluid communication with the engine, the rotational assembly including a bladed compressor rotor of the compressor section, a bladed turbine rotor of the turbine section, and the shaft connecting the bladed compressor rotor and the bladed turbine rotor, the shaft coupled with the engine shaft, the rotational load being the bladed compressor rotor.

9. An assembly for an aircraft powerplant, the assembly comprising:

a rotational load; and a shaft coupled to the rotational load, the shaft extending along an axis between and to a first axial shaft end and a second axial shaft end, the shaft including a slotted axial segment extending circumferentially about the axis, the slotted axial segment extending axially between and to a first segment end and a second segment end, the slotted axial segment forming an axial portion of the shaft, the slotted axial segment having an outer diameter surface, a diameter of the slotted axial segment having a maximum at the first segment end and the second segment end and a minimum at an axially-intermediate position between the first segment end and the second segment end, the slotted axial segment having a convex profile facing radially outward from the shaft, the convex profile extending between the first segment end and the second segment end, the slotted axial segment including a first circumferentially-continuous body portion and a second circumferentially-continuous body portion, the first circumferentially-continuous body portion forming the first segment end, the second circumferentially-continuous body portion forming the second segment end, the slotted axial segment forming a plurality of slots extending lengthwise between and to the first circumferentially-continuous body portion and the second circumferentially-continuous body portion, the plurality of slots extending radially through the outer diameter surface, the plurality of slots being arranged as a circumferential array about the slotted axial segment.

10. An assembly for an aircraft powerplant, the assembly comprising:

a propulsion system including a propulsor, an engine, and a turbocompressor, the engine including an engine shaft, the engine shaft coupled with the propulsor, the turbocompressor including a compressor section, a turbine section, and a rotational assembly, the compressor section and the turbine section connected in fluid communication with the engine, the rotational assembly including a bladed compressor rotor of the compressor section and a bladed turbine rotor of the turbine section;

a shaft coupled with the engine shaft, the shaft connecting the bladed compressor rotor and the bladed turbine rotor, the shaft extending along an axis between and to a first axial shaft end and a second axial shaft end, the shaft including a slotted axial segment extending circumferentially about the axis, the slotted axial segment extending axially between and to a first segment end and a second segment end, the slotted axial segment having an outer diameter surface, the slotted axial segment forming a plurality of slots extending lengthwise through the slotted axial segment in an axial direction relative to the axis, the plurality of slots extending radially through the outer diameter surface, the plurality of slots being arranged as a circumferential array about the slotted axial segment.

* * * * *